United States Patent
Petersen et al.

(10) Patent No.: US 10,423,770 B2
(45) Date of Patent: Sep. 24, 2019

(54) AUTHENTICATION METHOD BASED AT LEAST ON A COMPARISON OF USER VOICE DATA

(71) Applicant: VALIDSOFT LIMITED, Dublin (IE)

(72) Inventors: John Petersen, London (GB); Daniel Thornhill, London (GB)

(73) Assignee: VALIDSOFT LIMITED, Dublin (IE)

( * ) Notice: Subject to any disclaimer, the term of this patent is extended or adjusted under 35 U.S.C. 154(b) by 148 days.

(21) Appl. No.: 15/543,413

(22) PCT Filed: Sep. 24, 2015

(86) PCT No.: PCT/GB2015/052771
§ 371 (c)(1),
(2) Date: Jul. 13, 2017

(87) PCT Pub. No.: WO2016/113521
PCT Pub. Date: Jul. 21, 2016

(65) Prior Publication Data
US 2018/0004925 A1 Jan. 4, 2018

(30) Foreign Application Priority Data
Jan. 13, 2015 (GB) .................................. 1500505.1

(51) Int. Cl.
*G06F 21/32* (2013.01)
*H04L 9/32* (2006.01)
(Continued)

(52) U.S. Cl.
CPC .............. *G06F 21/32* (2013.01); *G10L 17/04* (2013.01); *G10L 17/10* (2013.01); *G10L 17/22* (2013.01);
(Continued)

(58) Field of Classification Search
USPC ........................................................ 704/273
See application file for complete search history.

(56) References Cited

U.S. PATENT DOCUMENTS 5,608,784 A * 3/1997 Miller ..................... G06F 21/32
379/142.15
6,092,192 A * 7/2000 Kanevsky ............... G06F 21/32
382/115

(Continued)

OTHER PUBLICATIONS

International Search Report for International Application No. PCT/GB2015/052771, dated Jan. 5, 2016.
(Continued)

*Primary Examiner* — Jakieda R Jackson
(74) *Attorney, Agent, or Firm* — Jason H. Vick; Sheridan Ross PC

(57) ABSTRACT

An authentication method. The method comprises comparing user voice data received via an electronic device to a stored voice template to determine a voice authentication parameter. A voice authentication threshold is determined and the voice authentication parameter is compared to the voice authentication threshold to determine whether to authenticate the user. Determining the voice authentication threshold comprises determining a current value of an enrollment counter, then comparing the current value of the enrollment counter to an enrollment counter threshold and determining whether the stored voice template is fully enrolled according to the result. If the stored voice template is fully enrolled, the voice authentication threshold is set to a first voice authentication threshold. If the stored voice template is not fully enrolled then a device attribute received from the electronic device is compared to a stored device attribute. If the received device attribute matches the stored device attribute, the voice authentication threshold is set to a second voice authentication threshold determined by the
(Continued)

current value of the enrollment counter. If the received device attribute does not match the stored device attribute, the voice authentication threshold is set to a third voice authentication threshold.

11 Claims, 3 Drawing Sheets

(51) Int. Cl.
    *H04L 29/06*     (2006.01)
    *G10L 17/04*     (2013.01)
    *G10L 17/10*     (2013.01)
    *G10L 17/22*     (2013.01)

(52) U.S. Cl.
    CPC ........ *H04L 9/3231* (2013.01); *H04L 63/0861* (2013.01); *H04L 2463/082* (2013.01)

(56) References Cited

U.S. PATENT DOCUMENTS

| | | | | |
|---|---|---|---|---|
| 8,265,341 | B2* | 9/2012 | Dernis | G06K 9/00892 382/103 |
| 9,515,877 | B1* | 12/2016 | Tempel | H04L 41/0806 |
| 9,619,663 | B2* | 4/2017 | Refstrup | B41J 2/17546 |
| 9,799,338 | B2* | 10/2017 | Grover | G06F 21/32 |
| 2002/0128844 | A1* | 9/2002 | Wilson | G06F 21/64 704/270 |
| 2003/0174163 | A1* | 9/2003 | Gnanamgari | G06F 3/0386 715/738 |
| 2006/0106605 | A1* | 5/2006 | Saunders | G10L 17/04 704/246 |
| 2009/0025071 | A1 | 1/2009 | Mumm et al. | |
| 2010/0076770 | A1* | 3/2010 | Ramaswamy | G10L 17/06 704/273 |
| 2010/0313245 | A1* | 12/2010 | Brandt | G06F 21/33 726/4 |
| 2011/0224986 | A1* | 9/2011 | Summerfield | G10L 17/12 704/246 |
| 2012/0253810 | A1* | 10/2012 | Sutton | G06F 21/32 704/246 |
| 2012/0293642 | A1* | 11/2012 | Berini | G06F 21/32 348/77 |
| 2013/0159194 | A1* | 6/2013 | Habib | G06F 21/32 705/66 |
| 2013/0272586 | A1* | 10/2013 | Russo | G06K 9/00087 382/124 |
| 2014/0172430 | A1* | 6/2014 | Rutherford | G06Q 20/20 704/273 |
| 2018/0218139 | A1* | 8/2018 | Tussy | G06F 21/34 |
| 2019/0080189 | A1* | 3/2019 | Van Os | G06K 9/00912 |

OTHER PUBLICATIONS

Written Opinion for International Application No. PCT/GB2015/052771, dated Jan. 5, 2016.
Combined Search and Examination Report Under Sections 17 and 18(c) for GB Patent Application No. 1500505.1, dated Jul. 3, 2015.
Intention to Grant for Corresponding European Application No. 15774665,2, dated Jan. 2, 2019.

* cited by examiner

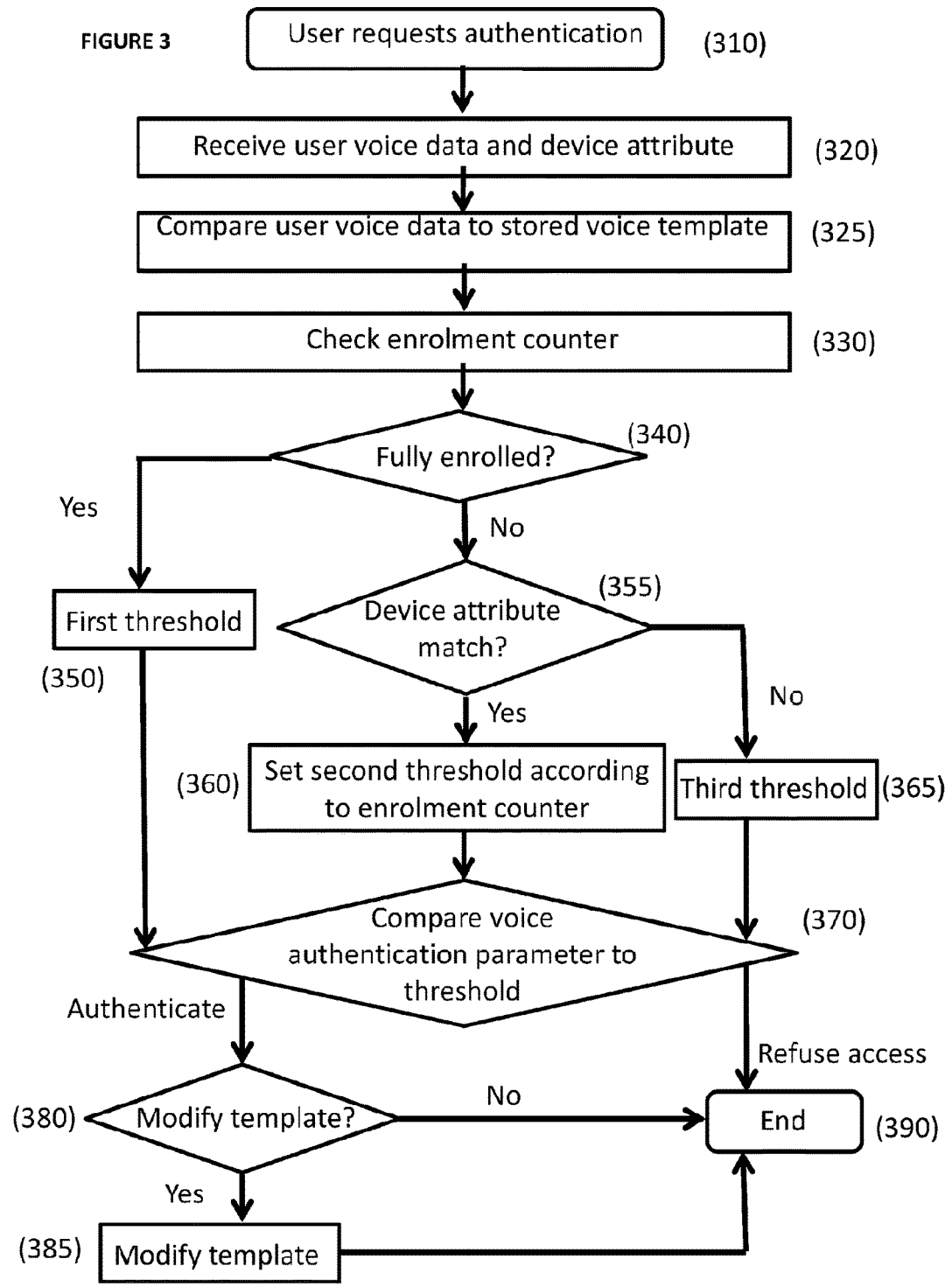

AUTHENTICATION METHOD BASED AT LEAST ON A COMPARISON OF USER VOICE DATA

CROSS REFERENCE TO RELATED APPLICATIONS

This application is a national stage application under 35 U.S.C. 371 of PCT Application No. PCT/GB2015/052771, having an international filing date of 24 Sep. 2015, which designated the United States, which PCT application claimed the benefit of Great Britain Application No. 1500505.1, filed 13 Jan. 2015, each of which are incorporated herein by reference in their entirety.

The present invention relates to an authentication method to authenticate a user.

BACKGROUND

Many services are provided remotely by telephone or through an internet connection. Additionally, the services may relate to confidential information. There is a need to ensure that a user accessing the confidential information is authorized to access that information. That is, it is necessary to have a procedure in place to prevent or reduce fraud occurring through an unauthorized user being able to access the confidential information.

An example of a service offering remote access to confidential information is online banking—that is, offering and using banking services over an internet connection. An online banking service provides the advantage that a user does not have to be present in a bank branch to carry out an operation involving a bank account associated with the user. However, to implement it has been necessary to develop methods by which a user attempting to utilise the service can be authenticated. For example, in a typical online banking service, authentication comprises a user providing a password or other authentication information known only to an authorized user. However, accessing an online banking service via an internet connection suffer from inherent security issues. For example, a third party may be able to obtain secure information through phishing, hacking or other illicit means. Additionally, the level of technical competence differs between users which can allow further vulnerabilities. For example, a user who is not confident with information technology may not be used to suitably securing their private data.

In view of these problems, additional authentication methods have been provided in existing remote access services. One such authentication method involves authenticating a user through some apparatus or object possessed by the user. For example, a bank may provide a user with a "card reader" as an authentication apparatus. However, disadvantageously, this requires the user to have access to the card reader to access the service, limiting the ability of the user to access the service when travelling and causing user friction by inconveniencing a user.

Biometric authentication systems involve the identification of humans by their characteristic traits. Biometric identifiers are the distinctive, measurable characteristics used to label and describe individuals. Examples include, but are not limited to fingerprint and face recognition. These characteristics are typically detected using a biometric scanning apparatus, for instance a microphone for detecting vocal patterns or other characteristics. In this way, voice prints corresponding to a detected vocal pattern may be produced which can be used in speaker recognition. Speaker recognition is the identification of a person who is speaking by characteristics of their voice, and is also known as voice recognition. Traditional methods of producing and using voice prints for speaker recognition include frequency estimation, hidden Markov models and pattern matching algorithms and will be well known to the appropriately skilled person.

BRIEF SUMMARY OF THE DISCLOSURE

According to a first aspect of the present invention there is provided an authentication method comprising: comparing user voice data received via an electronic device to a stored voice template to determine a voice authentication parameter; determining a voice authentication threshold; and comparing the voice authentication parameter to the voice authentication threshold to determine whether to authenticate the user; wherein determining the voice authentication threshold comprises: determining a current value of an enrolment counter; comparing the current value of the enrolment counter to an enrolment counter threshold and determining whether the stored voice template is fully enrolled according to the result; if the stored voice template is fully enrolled, setting the voice authentication threshold to a first voice authentication threshold; and if the stored voice template is not fully enrolled: comparing a device attribute received from the electronic device to a stored device attribute; if the received device attribute matches the stored device attribute, setting the voice authentication threshold to a second voice authentication threshold determined by the current value of the enrolment counter; and if the received device attribute does not match the stored device attribute, setting the voice authentication threshold to a third voice authentication threshold.

According to a second aspect of the present invention there is provided an authentication server comprising: a receiver arranged to: receive user voice data via an electronic device; and receive a device attribute from the electronic device; a memory arranged to store a stored voice template and a stored device attribute; and a control unit arranged to: compare the user voice data to the stored voice template to determine a voice authentication parameter; determine a voice authentication threshold; and compare the voice authentication parameter to the voice authentication threshold to determine whether to authenticate the user; wherein, to determine the voice authentication threshold, the control unit is further arranged to: determine a current value of an enrolment counter; compare the current value of the enrolment counter to an enrolment counter threshold and determine whether the stored voice template is fully enrolled according to the result; if the stored voice template is fully enrolled, set the voice authentication threshold to a first voice authentication threshold; and if the stored voice template is not fully enrolled: compare a device attribute received from the electronic device to a stored device attribute; if the received device attribute matches the stored device attribute, set the voice authentication threshold to a second voice authentication threshold determined by the current value of the enrolment counter; and if the received device attribute does not match the stored device attribute, set the voice authentication threshold to a third authentication threshold.

An authentication method may comprise: comparing user voice data received via an electronic device to a stored voice template to determine a voice authentication parameter; determining a voice authentication threshold; and comparing the voice authentication parameter to the voice authentication threshold to determine whether to authenticate the user; wherein determining the voice authentication threshold comprises: determining a current value of an enrolment counter; if the current value of the enrolment counter indicates that the stored voice template is fully enrolled, setting the voice authentication threshold to a first voice authentication threshold value; and if the current value of the enrolment counter does not indicate that the stored voice template is fully enrolled: comparing a device attribute received from the electronic device to a stored device attribute; if the received device attribute matches the stored device attribute, setting the voice authentication threshold to a second voice authentication threshold determined by the current value of the enrolment counter; and if the received device attribute does not match the stored device attribute, setting the voice authentication threshold to a third voice authentication threshold.

In relation to the third voice authentication threshold, the second voice authentication threshold may increase a range of voice authentication parameters which indicate authentication of the user.

The second voice authentication threshold may be lower than the third voice authentication threshold; and wherein authentication of the user may be indicated if the voice authentication parameter is greater than the voice authentication threshold.

The third voice authentication threshold may be equal to the first voice authentication threshold.

The method may further comprise comparing the current value of the enrolment counter to an enrolment counter threshold and determining whether the stored voice template is fully enrolled according to the result.

The method may further comprise modifying the stored voice template using the received user voice data if it is determined to authenticate the user.

The method may further comprise: updating the enrolment counter if the stored voice template is modified.

The stored voice template may only be modified if the stored voice template is not fully enrolled.

The stored voice template may only be modified if the voice authentication parameter indicates a degree of similarity between the user voice data and the stored voice template within a predetermined range.

The method may further comprise performing an initial enrolment process, the initial enrolment process comprising: receiving an initial user voice sample; generating the stored voice template using the initial user voice sample; receiving a device attribute of the electronic device associated with the user; and storing the device attribute.

The initial enrolment process may further comprise: setting the enrolment counter to an initial value.

An authentication server may comprise: a receiver arranged to: receive user voice data via an electronic device; and receive a device attribute from the electronic device; a memory arranged to store a stored voice template and a stored device attribute; and a control unit arranged to: compare the user voice data to the stored voice template to determine a voice authentication parameter; determine a voice authentication threshold; and compare the voice authentication parameter to the voice authentication threshold to determine whether to authenticate the user; wherein, to determine the voice authentication threshold, the control unit is further arranged to: determine a current value of an enrolment counter; if the current value of the enrolment counter indicates that the stored voice template is fully enrolled, set the voice authentication threshold to a first voice authentication threshold value; and if the current value of the enrolment counter does not indicate that the stored voice template is fully enrolled: compare a device attribute received from the electronic device to a stored device attribute; if the received device attribute matches the stored device attribute, set the voice authentication threshold to a second voice authentication threshold determined by the current value of the enrolment counter; and if the received device attribute does not match the stored device attribute, set the voice authentication threshold to a third authentication threshold.

An electronic device may comprise: a communication module arranged to: transmit user voice data to an authentication server; transmit a device attribute of the electronic device to the authentication server; and receive an indication of whether the user is authenticated; wherein the user voice data and the device attribute are usable by the authentication server to determine whether to authenticate the user.

Another aspect of the invention provides a computer program comprising instructions arranged, when executed, to implement a method in accordance with any one of the above-described aspects. A further aspect provides machine-readable storage storing such a program.

BRIEF DESCRIPTION OF THE DRAWINGS

Embodiments of the invention are further described hereinafter with reference to the accompanying drawings, in which:

FIG. 3 is a flow diagram for an authentication method in accordance with an embodiment of the present invention;

DETAILED DESCRIPTION

The capabilities of modern electronic devices—such as a mobile telecommunication device—allow a number of different biometric identifiers to be determined by the electronic device. This is especially convenient, as it means a user may provide samples of a given biometric identifier while they are mobile, instead of being constrained to certain locations where the appropriate apparatus is located. In particular, an electronic device is typically able to receive a voice sample from a user.

Figure 1:
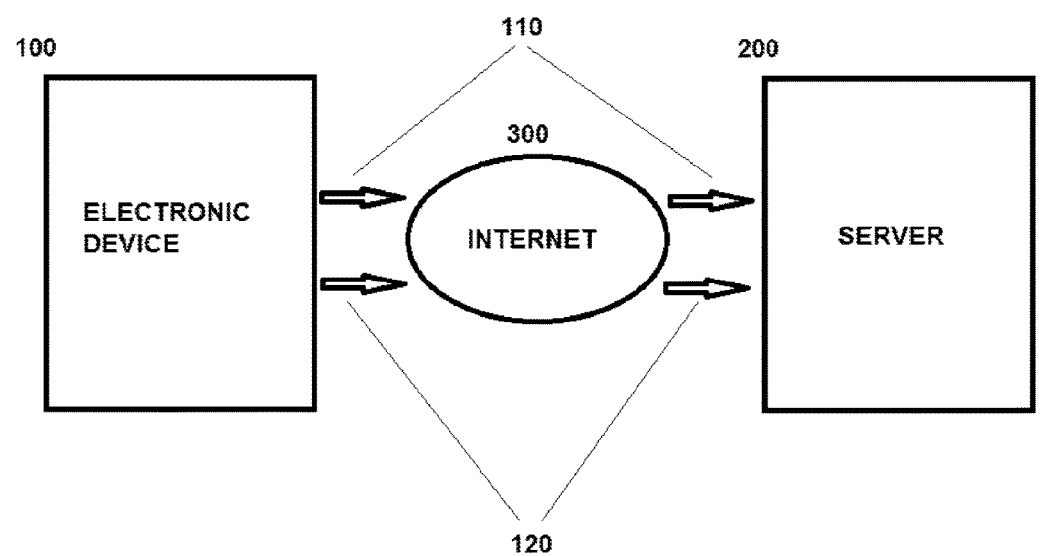
FIG. 1 shows an embodiment of the present invention comprising an authentication server and an electronic device communicating via a network.

In an exemplary embodiment of the present invention shown in FIG. 1, an electronic device 100 is in communication with a server 200 via a network connection, such as through the Internet 300. A user may be authenticated using an authentication method involving the system shown in FIG. 1.

It will be appreciated that the electronic device 100 may be a laptop, smartphone, or any other type of electronic device, in particular including other types of mobile devices. Embodiments of the present invention are particular advantageous for mobile devices as they do not require a mobile user to have any further equipment (such as a card reader as described above) to authenticate themselves, for instance to an online banking service.

Additionally, it will be appreciated that the electronic device 100 may connect to the Internet 300 via a wired or wireless connection depending on the state of the electronic device 100. Similarly, the server 200 may also be connected to the Internet 300 via a wired or wireless connection.

The electronic device 100 is arranged such that it can receive a biometric sample from a user. That is, the electronic device 100 is configured to be able to measure, record or otherwise determine a sample of a biometric identifier from the user. An example of a biometric identifier which the electronic device 100 is capable of determining is a user voice sample. However, the present invention is not limited to this. In the following exemplary embodiment, the biometric identifier to be used in the present invention is taken to be a user voice sample for simplicity of description, though at each instance an alternative biometric identifier, for instance a retina scan, may be substituted.

The user voice sample may be used to provide user voice data 110 to the server 200. For example, this apparatus may comprise a microphone, such as may be provided in a typical electronic device 100 to support telephone functions or voice-activated commands. The microphone is used to receive a user voice sample from a user in possession of the electronic device 100. In an electronic device 100, the microphone is typically provided alongside apparatus for converting the received sound signal—in this case the user voice sample—from an analogue signal to a digital signal. The digital signal may then be stored in a memory included in the electronic device 100. In addition to or as an alternative to storing the digital signal, the digital signal may be transmitted to another location such as another electronic device or a server. This storage may only be intended to be short-term, and so the user voice sample may be stored in a buffer memory, cache memory, random access memory or similar. In other embodiments, the microphone may be provided separate to the electronic device 100. In this case, the microphone may be connected to the electronic device 100 such that the electronic device 100 may obtain a user voice sample via the microphone. In the following, reference to a user voice sample may relate to either the analogue signal or the converted, digital signal.

Figure 2:
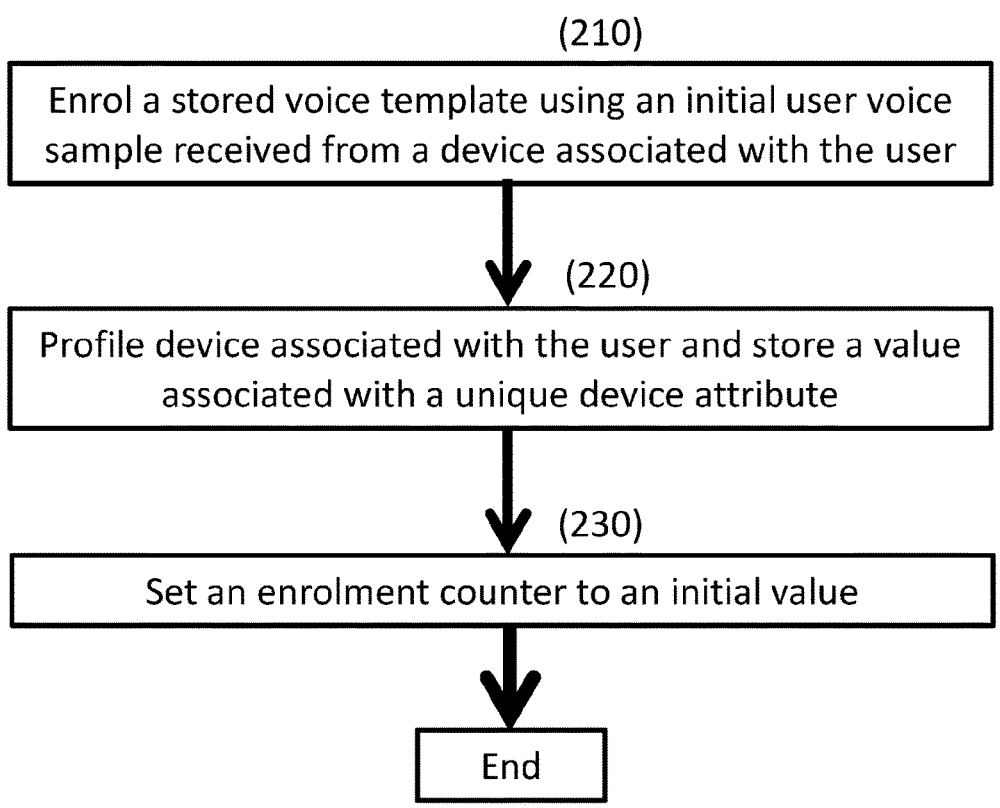
FIG. 2 is a flow diagram for an initial enrolment method in accordance with an embodiment of the present invention.

FIG. 2 shows a method for performing an initial enrolment process in accordance with an embodiment of the present invention.

The method begins, at step 210, with the server 200 receiving an initial user voice sample via an electronic device 100 associated with the user. The initial voice sample may be a single repeat of a predetermined phrase. The initial user voice sample is then used to enroll a stored voice template at the server 200.

At step 220 the electronic device 100 associated with the user is profiled. The profiled electronic device is the device used to provide the voice sample. Profiling the electronic device 100 may result in the server 200 receiving at least one value associated with a unique electronic device attribute, for example an IMSI number or IMEI number. The received device attribute is then stored at the server 200.

At step 230 an enrolment counter is set to an initial value. The enrolment counter may be maintained or stored at the server 200.

The enrolment process of FIG. 2 is based on the assumption that the identity of the user and their authorisation to access a service for which they are enrolling has been independently verified. Furthermore, it is assumed that the electronic device they use to provide the voice sample, and which is profiled, is the same device which they will later use to provide voice samples during authentication of the user when they attempt to access a remote service.

The initial user voice sample may be provided by the user over a secure communication channel. The secure communication channel may have been established using another authentication method to verify that the user providing the initial user voice sample is a legitimate user of a service, the service being the service to which the authentication method of the present invention pertains.

Generating the stored voice template may comprise storing the stored voice template at the server 200. Generating the stored voice template may comprise processing the received initial user voice sample. Processing may comprise altering or adjusting certain aspects of the initial user voice sample. For example, the initial user voice sample may be scanned or otherwise checked to determine the presence of background noise or other aural aberrations which may be undesirable. The generating step may then comprise the removal or mediation of any determined features such as these.

In certain embodiments, the initial enrolment procedure may comprise, or further comprise, receiving a device attribute of the electronic device 100, wherein the electronic device 100 may be associated with the user. The received device attribute is then stored at the server 200. The device attribute may be provided from the electronic device 100 over a secure communication channel during an initial configuration process of a service to which the authentication method of the present invention is intended to pertain. The secure communication channel may be established using another authentication method to verify that the electronic device 100 providing the device attribute is the electronic device 100 associated with the legitimate user of the service. The secure communication channel by which the device attribute is provided to the server 200 may also be the secure communication channel by which the initial user voice sample is provided.

In certain embodiments, the initial enrolment process further comprises setting the enrolment counter to an initial value.

FIG. 3 shows an authentication method in accordance with an embodiment of the present invention.

According to certain embodiments of the present invention, the authentication method comprises determining to authenticate a user according to a result of a comparison between a voice authentication parameter and a voice authentication threshold. The voice authentication parameter may be determined according to a comparison relating to user voice data 110. The voice authentication threshold is determined according to a current value of an enrolment counter, and may further be determined according to a comparison relating to a device profile. The user voice data 110 may be received from an electronic device 100 to which the device profile corresponds.

The method begins in response to a user request for authentication 310. It will be appreciated that this step is not vital to the operation of the present invention and merely serves to illustrate an event which may lead to the authentication method being performed. For instance, in other embodiments of the invention, the authentication method may be performed automatically upon a user attempting to access a service provided by the server 200.

In step 320, the server 200 receives user voice data 110 and a device attribute 120 from an electronic device. The user voice data may be compared with a stored voice template to determine a voice authentication parameter. The received user voice data 110 may be provided via an electronic device 100 associated with the user. In the embodiment of FIG. 1 the comparison of received user voice data 110 may occur at the server 200, and so the electronic device 100 is arranged to transmit user voice data 110 to the server 200. The electronic device 100 may therefore comprise a transmitter, such that it can provide the server 200 with the user voice data 110.

The voice data 110 may be generated from the user voice sample provided to the electronic device 100 either at the electronic device 100 or at the server 200. The generation may be a null step, such that the user voice data 110 is the same as the user voice sample which has been received by the electronic device 100 (that is, no modification of the user voice sample occurs during the generation of the user voice data 110, or the modification occurs when the user voice sample is being stored in the electronic device 100). In this embodiment the electronic device 100 transmits the user voice sample to the server 200, and the server 200 may be arranged to store the user voice sample as user voice data 110. Alternatively, the user voice data 110 may be generated from the user voice sample through some additional processing step occurring at the electronic device 100 or the server 200.

At step 325 the server 200 performs a comparison between the user voice data 110 and a stored voice template. The stored voice template may be provided to the server 200 during an initial enrolment process as described in connection with FIG. 2. The stored voice template provides an indication of biometric information associated with a legitimate user. A comparison between the user voice data 110 and the stored voice template may therefore be used to determine a voice authentication parameter indicating whether or not the user who provided the user voice sample (used to generate the user voice data 110) is the legitimate user. This indication may be related to how closely the user voice data 110 and the stored voice template match, correlate or otherwise resemble each other.

The voice authentication parameter may provide a quantitative representation determined from the result of the comparison relating to the user voice data. In particular, the voice authentication parameter may be a numerical value determined based on how closely the user voice data 110 resembles the stored voice template. Alternatively, the voice authentication parameter may be represented by a multi-dimensional array of values, determined based on how closely the user voice data 100 resembles the stored voice template According to an embodiment of the present invention, determining whether to authenticate the user is based on the result of a comparison between the voice authentication parameter and a voice authentication threshold. In step 330, an enrolment counter is checked to determine a current value of the enrolment counter. The enrolment counter may have been set to an initial value during an initial enrolment process. Furthermore, the value of the enrolment counter may have been modified from the initial value as a result of previous performances of the authentication method resulting in an indication that the stored voice template should be modified. As such, the current value of the enrolment counter may provide an indication as to a number of times the stored voice template has been modified since an initial enrolment process was performed. Furthermore, the number of times the stored voice template has been modified may indicate how near to completion the stored voice template is; where a state of being complete is one where the stored voice template is said to be fully enrolled.

In step 340, it is determined whether the current value of the enrolment counter indicates that the stored voice template is fully enrolled. If voice template is fully enrolled there may be no further modification of the stored voice template. For example, the fully enrolled stored voice template may relate to an occasion where it is determined that the stored voice template is a suitable representation of the voice of the legitimate user.

To determine whether the current value indicates that the stored voice template is fully enrolled, a comparison between the current value and an enrolment counter threshold may be performed. If the stored voice template is fully enrolled, a voice authentication threshold is set to a first voice authentication threshold in step 350. This may be a relatively high threshold as it may be expected that the stored voice template now accurately represents the user's voice.

If it is determined that the stored voice template is fully enrolled, the server may not receive the device attribute 120. That is, reception of the device attribute 120 may occur after it is determined whether the stored voice template is fully enrolled, for example, as a result of the server 200 prompting the electronic device 100 to provide the device attribute 120 if it is determined that stored voice template is not fully enrolled. As such, the reception of the device attribute in step 320 may be optional.

If the stored voice template is not fully enrolled, the received device attribute 120 is checked against a stored device attribute in step 355 to determine if they match. The stored device attribute may have been obtained during an initial enrolment process, for example that described in FIG. 2.

A stored voice template which is not fully enrolled may indicate that the stored voice template is not a suitably accurate representation of the voice of the legitimate user. In view of this, a voice authentication threshold which is set for a fully enrolled stored voice template may be unsuitable.

In certain embodiments of the present invention, the attribute 120 of the electronic device 100 may be any unique identifier associated with the electronic device 100 or with a component of the electronic device 100. For example, the device attribute may be an IMSI (International Mobile Subscriber Identity) or an IMEI (International Mobile Station Equipment Identity), associated with a SIM card of the electronic device 100 or the electronic device 100 itself respectively.

In certain embodiments, the stored device attribute is a record of an attribute located at the server 200 and provided during an initial enrolment process for instance as described in connection with FIG. 2. The stored device attribute may therefore correspond to the electronic device 100 associated with the legitimate user. An indication as to whether or not the user is the user of a legitimate electronic device may be determined based on a comparison of the received attribute 120 of the electronic device 100 to the stored device attribute. Such an indication relies on the assumption that the legitimate electronic device 100 is in possession of the legitimate user.

If it is determined that the received device attribute 120 matches the stored device attribute, as a result of the check, then a voice authentication threshold is set to a second voice authentication threshold in step 360. The second voice authentication threshold may be determined by a value of an enrolment counter. This step may therefore further comprise checking a value of the enrolment counter. The enrolment counter may have initially been set during an initial enrolment process, for example that described in FIG. 2, or revised (as discussed below) during a previous authentication of the user. The strictness of the second voice authentication threshold changes as the stored voice template is modified.

Alternatively, if it is determined that the received device attribute 120 does not match the stored device attribute, as a result of the check, then a voice authentication threshold is set to a third voice authentication threshold in step 365. The third voice authentication threshold may be the same as the second voice authentication threshold.

In relation to the third voice authentication threshold, the second voice authentication threshold increases a range of voice authentication parameters which indicate authentication of the user. For example, in an embodiment of the present invention the range of voice authentication parameters is increased by the second voice authentication threshold being set lower that the third voice authentication threshold. In this example, authentication of the user is indicated if the voice authentication parameter is greater than the voice authentication threshold. Here, the result of the comparison relating to the device profile may influence the result of the comparison between the voice authentication parameter and the voice authentication threshold by affecting the voice authentication threshold. Advantageously, this means that while the stored voice template has not been fully enrolled, and so not provide an accurate representation of the user's voice, voice authentication is still possible by providing a less strict voice authentication threshold. The security of the authentication method is maintained by the additional reassurance of the user's identity provided by confirming that they are in possession of the registered electronic device. At the same time, voice authentication is still possible if a legitimate user chooses to use a different electronic device, albeit requiring a more strict voice authentication threshold.

It may be that the voice authentication parameter is such that it will be determined to authenticate the user regardless of whether the voice authentication threshold is set to the second voice authentication threshold or the third voice authentication threshold. In such a situation, the user voice data 110 may be a suitably good match (that is, closely correspond to) the stored voice template. Alternatively, it may be that the voice authentication parameter is such that it will be determined to not authenticate the user regardless of whether the voice authentication parameter is set to the second voice authentication threshold or the third voice authentication threshold. This situation may arise when the user voice data 110 is a poor match (that is, does not correspond to) the stored voice template.

In certain embodiments, it will be appreciated that the comparison 355 between the received attribute 120 of the electronic device and the stored device profile may therefore assist a legitimate user in being authenticated when, for example, the user voice data is not a perfect match with the stored voice template, or when the stored voice template is not an ideal representation of the user's voice or vocal pattern itself. This deficiency of the stored voice template may arise, for example, when a small number (for example, only one) of user voice samples are received during an initial enrolment procedure. In this situation, the stored voice template may be obtained more quickly than if many user voice samples were used in the construction of the stored voice template. However, the stored voice template being a less-precise match of the legitimate user's voice or vocal patterns is the trade-off for this increase in speed. It will be appreciated that, if the stored voice template is known to not be an ideal representation of the user's voice—as may be inferred from the current value of the enrolment counter not indicating full enrolment—then the voice authentication threshold may be set lower to account for expected discrepancies between the user voice data 110 and the stored voice template. However, this lowering of the voice authentication threshold may only occur if the received attribute 120 matches the stored device attribute, such that a reduction in security is compensated for to an extent.

Once the voice authentication threshold has been set, the voice authentication parameter can then be compared, in step 370, to the voice authentication threshold to determine whether the voice authentication threshold is overcome.

If the result of the comparison 370 does not overcome the voice authentication threshold, then the authentication method terminates at step 390.

If the result of the comparison 370 does overcome the voice authentication threshold, then it is determined to authenticate the user.

Additionally, if the user is authenticated, a check is made, in step 380, to determine whether to use the user voice data to modify the stored voice template.

If it is determined not to modify the stored voice template, then the method ends at step 390.

Alternatively, if it is determined to modify the stored voice template then the method proceeds to step 385 where the stored voice template is modified using the received user voice data 110. This may have the effect of reinforcing the enrolled voice template. This modification of the template may only be performed if the parameter determined through the comparison exceeds the voice authentication threshold by a certain amount, or meets a further requirement for a close match indicated by a modification threshold. Additionally, if the template is modified, the enrolment counter may also be incremented. For example, if an initial value of the enrolment counter, set during an initial enrolment process, was '1', then successful authentication of the user will result in the enrolment counter being set to a value of '2'. As evident from step 360, this may have an effect on the setting of the voice authentication threshold. The enrolment counter may thus indicate how many voice samples have been used to create the template. In certain embodiments the voice authentication threshold may be adjusted to require a stricter match between the received voice data and the template as the number of voice samples used to generate the template increases.

After modifying the template and incrementing the enrolment counter, if applicable, the authentication method terminates in step 390. If a request for a new performance of the authentication method is received, the incremented value of the enrolment counter is the value of the enrolment counter for this new performance, and so would be returned in step 330. As such, performances of the authentication method which result in the user being authenticated allows for modification of the enrolled voice template, which may serve to improve the enrolled voice template with regards to use in future authentication method performances. Accordingly, while the enrolled voice template is being modified, the value of the enrolment counter is modified such that the voice authentication threshold may also change.

In certain embodiments of the present invention, modifying the stored voice template to generate a new stored voice template comprises determining a degree of similarity between the user voice data 110 and the stored voice template, and modifying the stored voice template based on the degree of similarity. Furthermore, in certain embodiments the stored voice template is only modified using the user voice data 110 if the degree of similarity is within a predetermined modification range. For example, in certain embodiments the degree of similarity may be represented by a value, and then a check is made to determine if this value lies within the predetermined modification range. For example, in certain embodiments if the degree of similarity indicates a very close match between the user voice data 110 and the stored voice template, then the stored voice template is not modified using the user voice data 110. In another embodiment, if the authentication of the user is indicated but the degree of similarity does not indicate a particularly close match between the user voice data 100 and the stored voice template (that is, the voice authentication parameter only passed the threshold by a small margin), then the stored voice template is not modified using the user voice data.

In certain embodiments of the present invention, the attribute 120 of the electronic device comprises a plurality of attributes 120 of the electronic device 100. For example, both an IMSI and an IMEI may be used as the attribute. In such embodiments, the stored device attribute at the server 200 comprises a plurality of stored device attributes. Performing the comparison relating to the device profile may therefore comprise comparing each of the received plurality of attributes 120 of the electronic device 100 to the corresponding one of the plurality of stored device attributes at the server 200.

In certain embodiments of the present invention, the server 200 transmits an indication as to whether or not the user is authenticated to the electronic device 100. That is, the server 200 may transmit an indication of the result of the second comparison to the electronic device 100.

In certain embodiments of the present invention, the above described operations occurring at the server 200 occur instead at a plurality of servers.

It will be appreciated that embodiments of the present invention can be realized in the form of hardware, software or a combination of hardware and software. Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

The invention claimed is:

1. An authentication method comprising:
    comparing user voice data received via an electronic device to a stored voice template to determine a voice authentication parameter;
    determining a voice authentication threshold; and
    comparing the voice authentication parameter to the voice authentication threshold to determine whether to authenticate the user;
    wherein determining the voice authentication threshold comprises:
        determining a current value of an enrolment counter indicating a number of times the stored voice template was modified since an initial enrolment process, or indicating a number of voice samples used to create the stored voice template;
        comparing the current value of the enrolment counter to an enrolment counter threshold and determining whether the stored voice template is fully enrolled, indicating the stored voice template is complete or accurate, according to the result;
        if the stored voice template is fully enrolled, setting the voice authentication threshold to a first voice authentication threshold; and
        if the stored voice template is not fully enrolled:
            comparing a device attribute received from the electronic device to a stored device attribute;
            if the received device attribute matches the stored device attribute, setting the voice authentication threshold to a second voice authentication threshold determined by the current value of the enrolment counter; and
            if the received device attribute does not match the stored device attribute, setting the voice authentication threshold to a third voice authentication threshold.

2. The method of claim 1, wherein, in relation to the third voice authentication threshold, the second voice authentication threshold increases a range of voice authentication parameters which indicate authentication of the user.

3. The method of claim 1, wherein the second voice authentication threshold is lower than the third voice authentication threshold; and
    wherein authentication of the user is indicated if the voice authentication parameter is greater than the voice authentication threshold.

4. The method of claim 1, wherein the third voice authentication threshold is equal to the first voice authentication threshold.

5. The method of claim 1, further comprising modifying the stored voice template using the received user voice data if it is determined to authenticate the user.

6. The method of claim 5, further comprising:
    updating the enrolment counter if the stored voice template is modified.

7. The method of claim 6, wherein the stored voice template is only modified if the stored voice template is not fully enrolled.

8. The method of claim 5, wherein the stored voice template is only modified if the voice authentication parameter indicates a degree of similarity between the user voice data and the stored voice template within a predetermined range.

9. The method of claim 1, further comprising performing an initial enrolment process, the initial enrolment process comprising:
    receiving an initial user voice sample;
    generating the stored voice template using the initial user voice sample;
    receiving a device attribute of the electronic device associated with the user; and
    storing the device attribute.

10. The method of claim 9, wherein the initial enrolment process further comprises:
    setting the enrolment counter to an initial value.

11. An authentication server comprising:
    a receiver arranged to:
        receive user voice data via an electronic device; and
        receive a device attribute from the electronic device;
    a memory arranged to store a stored voice template and a stored device attribute; and a control unit arranged to:
compare the user voice data to the stored voice template to determine a voice authentication parameter;
determine a voice authentication threshold; and
compare the voice authentication parameter to the voice authentication threshold to determine whether to authenticate the user;
wherein, to determine the voice authentication threshold, the control unit is further arranged to:
determine a current value of an enrolment counter indicating a number of times the stored voice template was modified since an initial enrolment process or indicating a number of voice samples used to create the stored voice template;
compare the current value of the enrolment counter to an enrolment counter threshold and determine whether the stored voice template is fully enrolled, indicating the stored voice template is complete or accurate, according to the result;
if the stored voice template is fully enrolled, set the voice authentication threshold to a first voice authentication threshold; and
if the stored voice template is not fully enrolled:
compare a device attribute received from the electronic device to a stored device attribute;
if the received device attribute matches the stored device attribute, set the voice authentication threshold to a second voice authentication threshold determined by the current value of the enrolment counter; and
if the received device attribute does not match the stored device attribute, set the voice authentication threshold to a third authentication threshold.

* * * * *